United States Patent [19]

Ward et al.

[11] E Patent Number: Re. 33,658

[45] Reissued Date of Patent: Aug. 6, 1991

[54] LUBRICANTS FOR RECIPROCATING AIR COMPRESSORS

[75] Inventors: Eldon L. Ward; Philip W. McGraw, both of Lake Jackson, Tex.; Thomas J. Appleman, Sterling, Va.

[73] Assignee: The Dow Chemical Company, Midland, Mich.

[21] Appl. No.: 370,356

[22] Filed: Jun. 22, 1989

Related U.S. Patent Documents

Reissue of:

[64] Patent No.: 4,751,012
Issued: Jun. 14, 1988
Appl. No.: 927,296
Filed: Nov. 4, 1986

U.S. Applications:

[63] Continuation-in-part of Ser. No. 812,167, Dec. 23, 1985, abandoned.

[51] Int. Cl.[5] ..... C10M 105/14; C10M 105/36

[52] U.S. Cl. ..... 252/52 A; 252/52 R; 252/56 S; 252/56 D; 560/76; 560/103; 568/607; 568/624; 568/625; 568/606

[58] Field of Search ..... 252/52 A, 52 R, 56 S, 252/56 D; 560/76, 103; 568/607, 624, 625, 606

[56] References Cited

U.S. PATENT DOCUMENTS

| | | | |
|---|---|---|---|
| 3,415,891 | 12/1968 | Turumaru | 252/56 |
| 3,879,308 | 4/1975 | Miller | 252/56 R |
| 4,302,343 | 11/1981 | Carswell et al. | 252/33.4 |
| 4,302,349 | 11/1981 | Kasswig et al. | 252/52 A |
| 4,362,635 | 12/1982 | Dhein et al. | 252/56 S |
| 4,370,247 | 1/1983 | Ostyn | 252/46.7 |
| 4,409,187 | 10/1983 | Köhler et al. | 252/51.5 R |
| 4,430,490 | 2/1984 | Duerge | 528/77 |
| 4,476,038 | 10/1984 | Fock et al. | 252/52 A |
| 4,496,632 | 1/1985 | Camp et al. | 252/52 A |
| 4,501,616 | 2/1985 | Fink et al. | 252/52 A |

FOREIGN PATENT DOCUMENTS

| | | |
|---|---|---|
| 933721 | 2/1961 | United Kingdom . |
| 986066 | 9/1963 | United Kingdom . |
| 1162818 | 11/1966 | United Kingdom . |

OTHER PUBLICATIONS

Carswell, et al, "A Blend of a Polyglycol and a Tetra Ester as a Lubricant for Rotary Screw Air Compressors", Lubrication Engineering, vol. 39, 11, 684–689.

*Primary Examiner*—William R. Dixon, Jr.
*Assistant Examiner*—E. McAvoy

[57] ABSTRACT

Synthetic lubricants comprising 15 to 45 weight percent of an ester of a monohydric alcohol of 4 to 18 carbon atoms with one or more aromatic or alkane dicarboxylic acids having 4 to 18 carbon atoms blended with 85 to 55 weight percent of one or more polyether polyols having a number average molecular weight from about 400 to 5000. The blends are compounded with antioxidants, corrosion inhibitors, and metal deactivators to produce a superior lubricant for reciprocating air compressors which gives a long life to the compressors.

12 Claims, No Drawings

LUBRICANTS FOR RECIPROCATING AIR COMPRESSORS

Matter enclosed in heavy brackets [ ] appears in the original patent but forms no part of this reissue specification; matter printed in italics indicates the additions made by reissue.

CROSS-REFERENCE TO RELATED APPLICATIONS

This application is a continuation-in-part of Ser. No. 812,167 filed Dec. 23, 1985, now abandoned.

BACKGROUND OF THE INVENTION

This invention relates to synthetic lubricants which are a suitably inhibited blend of (1) an ester of a monohydric alcohol having 4 to 18 carbon atoms with one or more aromatic or alkane dicarboxylic acids and (2) one or more polyether polyols.

Reciprocating air compressors having air cushioned valves are well known in the art.

It is well known to use hydrocarbon lubricating oils to lubricate the pistons and piston rings of the foregoing air compressors and lubricate the bearings. Due to the high temperature and pressure of the air, it has been found that these hydrocarbon oils break down, leave deposits, and prevent the valves from operating correctly in a relatively short time. This requires manual repairs to clean the valves.

It is known that synthetic esters made from dicarboxylic acids have been used to produce long lasting compressor fluids, such as Anderol 495 sold by Nuodex for rotary screw air compressors. The major component of Anderol 495 is believed to be a dialkyl adipate. However, Anderol 495 does not have sufficient high temperature viscosity for suitable lubrication of the pistons and cylinders of reciprocating air compressors.

It is also known from U.S. Pat. No. 4,302,343 that rotary screw air compressors can be lubricated with a blend of polyhydric alcohol esters and polyether polyols. However, these lubricants are relatively expensive and leave deposits on the valves of a reciprocating air compressor.

Anderol 500 (a dialkyl phthalate composition) is known to be useful in reciprocating air compressors. However, this synthetic ester has the disadvantage of having a high viscosity during start up at low temperatures.

The U.S. Pat. No. 4,072,619 polyesteralkylene glycol compositions are disclosed wherein phenothiazine is incorporated into the alkylene glycols. However, these compositions have been found to degrade in a relatively short time i.e. 1000 hours.

Synthetic lubricants comprising a major amount of a polyester and a minor amount of a monocapped polyglycol are known from British Pat. Nos. ,933,721; 986,066; and 1,162,818, however all these compositions are disclosed to be only useful in aircraft gas turbines where a different viscosity range is needed.

SUMMARY OF THE INVENTION

It now has been found that a suitably inhibited blend of esters of aliphatic monohydric alcohols with one or more aromatic or alkane dicarboxylic acids have the required high temperature viscosity and stability to heat, air, and water.

More specifically, the synthetic base lubricants of this invention comprise a lubricant composition comprising, (A) about 15 to 45 weight percent of an ester of a monohydric alcohol having 4 to 18 carbon atoms with one or more aromatic or alkane dicarboxylic acids having 4 to 18 carbon atoms, and (B) about 85 to 55 weight percent of one or more polyether polyols have a flash point greater than 375° F. (191° C.) and which have the formula $$Z-[(-R^1O)_n-R^2]_m$$

where Z is the residue of a compound having 1-8 hydroxyl groups, $R^1$ is an alkylene radical having 2 to 4 carbon atoms, n is a number having an average value which will give a number average molecular weight range from about 400 to about 5000 for the final compound, m is an integer having a value of from 1 to about 8, $R^2$ is hydrogen or an alkyl group of 1 to 6 carbon atoms.

An additional aspect of the present invention comprises the above base lubricant with the addition of effective amounts of oxidation inhibitors, corrosion inhibitors, and metal or copper deactivators and a method of lubricating air compressors using the inhibited lubricant.

DETAILED DESCRIPTION OF THE INVENTION

The neutral esters used in this invention are commercially available. Examples of suitable esters are the esters of monohydric alcohols having 4 to 18 carbons such as butanol, octanol, decanol, etc with aromatic dicarboxylic acids such as phthalic, terephthalic and isophthalic acids.

Also useful are the esters of the above monohydric alcohols with alkanedioic acids having 4 to 18 carbons such as succinic, adipic, suberic, tetradecane 1,14-dioic acid, and hexadecane-1,16-dioic acid, Examples of the polyether polyols or polyoxyalkylene polyols used in this invention are those derived from ethylene oxide, propylene oxide, 1-2, or 2-3 butylene oxide. The above oxides may be polymerized alone, i.e., homopolymerized or in combination. The combined oxides may also be combined in a random or block addition. While some of the above compounds may be of a hydrophilic nature, those of a hydrophobic nature are preferred, such as those derived from propylene oxide, butylene oxides or combinations thereof.

Examples of suitable capped polyoxyalkylene glycols are those derived from ethylene, propylene, and butylene oxides wherein the alkylene oxides are initiated from a compound having 1 to 8 active hydrogens in a known manner. The terminal hydroxyl groups may be further reacted with organic acids to form esters or with alkyl or aryl halides to form alkyl or aryl capped polyoxyalkylene are well known from the book "Polyurethanes" by Saunders and Frisch, Interscience Publishers (1962), pages 33-39. This book is incorporated by reference herein.

Examples of suitable initiator compounds which are employed to prepare the above polyether polyols are compounds having 1-8 active hydrogens such as for example water, methanol, ethanol, propanol, butanol, ethylene glycol, propylene, glycol, butylene glycol, 1,6-hexane diol, glycerine, trimethylolpropane, pentaerythritol, sorbitol, sucrose, mixtures thereof and the like.

Other initator compounds which are useful include monohydric phenols and dihydric phenols and their alkylated derivatives such as phenol, o, m, and p cresol, guaiacol, saligenin, carvacrol, thymol, o and p -hydroxy diphenyl, catechol, resorcinol, hydroquinone, pyrogallol, and phloroglucinol.

The foregoing polyether polyols should have a flash point greater that 375° F. (191° C.) and preferably greater than 450° F. (232° C.). They also should have a number average molecular weight range from about 400 to 5000 and preferably in the range 700 to 2500.

The foregoing polyether polyols are blended to give a base lubricant composition containing 15 to 45 weight percent of the esters and 85 to 55 weight percent of the polyols with the ranges 15 to 25 and 85 to 75 being the preferred ranges, respectively.

The compositions of this invention are used in a reciprocating air compressor and are selected so as to have a viscosity in the range of 5 to 25 centistokes at 210° F. (99° C.) and preferably 6 to 16 centistokes at 210° F. (99° C.) and a pour point in the range of 0° to −65° F. (18° to −54° C.).

The final lubricant compositions of this invention may contain effective amounts of ashless additives, such as antioxidants, corrosion inhibitors, metal deactivators, lubricity additives, extreme pressure additives, dispersants, detergents, demulsifiers or such additives as may be required.

Examples of useful ashless antioxidants which can be used herein are phenyl naphthylamines, i.e., both alpha and beta-naphthyl amines; diphenyl amine; iminodibenzyl; p,p-dibutyl-diphenylamine; p,p'-dioctyldiphenylamine; and mixtures thereof. Other suitable antioxidants are hindered phenolics such as 6-t-butylphenol, 2,6-di-t-butylphenol and 4-methyl-2,6-di-t-butylphenol and the like.

Examples of suitable ashless metal corrosion inhibitors are commercially available, such as Irgalube 349 from Ciba-Geigy. This inhibitor compound is an aliphatic amine salt of phosphoric acid monohexyl ester. Other useful metal corrosion inhibitors are NA-SUL DTA and Na-SUL EDS from the White Chemical Company (diethylenetriamine dinonylnapthalene sulfonate and ethylene diamine dimonylnaphthalene sulfonate), respectively.

Examples of suitable ashless cuprous metal deactivators are imidazole, benzimidazole, pyrazole, benzotriazole, tolutriazole, 2-methyl benzimidazole, 3,5-dimethyl pyrazole, and methylene bis-benzotriazole.

An effective amount of the foregoing additives for use in a reciprocating air compressor is generally in the range from 0.1 to 5% by weight for the antioxidants, 0.1 to 5.0% by weight for the corrosion inhibitors, and 0.001 to 0.5 percent by weight for the metal deactivators. The foregoing weight percentages are based on the total weight of the polyether polyols and the esters. It is to be understood that more or less of the additives may be used depending upon the circumstances for which the final composition is to be used.

The following preparation and examples are presented to illustrate but not limit the invention.

PREPARATION

A formulation consisting of the following blend was prepared (A) 11,489 pounds 5211.4 kg (77.48%) of polypropylene glycol (number average molecular weight 1200)

(B) 2,872 pounds 1302.7 kg (19.37%) of Mobil Ester DB-32(1)

(C) 296 pounds 134.3 kg (2.0%) of p,p'-dioctyl diphenylamine (D) 148 pounds 67.1 kg (1.0%) of Ciba-Geigy IRGALUBE 349(2)

(E) 0.37 pounds 0.167 kg (25 parts per million) of Dow Corning DC-200(3)

(F) 15 pounds 6.8 kg (0.1%) of Mobil MOBILAD C-402(4)

(G) 7.4 pounds 3.35 kg (0.05%) of Sherwin-Williams CORBRATEC TT-100(5)

Notes: (1) diisooctyl adipate
(2) an amine salt of phosphoric acid (corrosion inhibitor)
(3) a silicone anti-foam
(4) a high mol. wt. polyacrylate (demulsifier)
(5) tolutriazole (copper deactivator)

In a suitable vessel, the ester and additives were blended together. After sufficient agitation time, the ester/additive mixture was transferred to the vessel which holds the polyglycol. The mixture was heated to 80° C. and agitated until the solution was clear. If the additives are ignored, the formulation contains 20% by weight of the ester and 80% by weight of the polypropylene glycol.

The above fluid was tested for corrosion resistance in accordance with ASTM D-665—procedure A and ASTM D-665—procedure B. The fluid passed both tests.

The fluid was found to have the following characteristics:

| Temperature, | Viscosity (centistokes) |
|---|---|
| 210° F. (99° C.) | 9.4 |
| 100° F. (38° C.) | 59.3 |
| 0° F. (−18° C.) | 3670 |

EXAMPLES 1-14

The above fluid was placed in fourteen reciprocating air compressors made by different manufacturers. The valves in each compressor were checked intermittently over a long period of time as shown in the table. The valves were found to be in excellent condition having no deposits or residues. The same compressors using petroleum oils have service deposits after 1000 to 4000 hours of operation which create reduced performance with the possibility of line fires.

TABLE

| Example | Compressor | Hours of Operation | Valve Discharge Temperature, °F. (°C.) |
|---|---|---|---|
| 1 | Ingersoll-Rand(XRE) | 12,000 | 176(80) |
| 2 | Ingersoll-Rand(PRE) | 12,000 | 208(98) |
| 3 | Ingersoll-Rand(XLE) | 4,380 | 250(121) |
| 4 | Quincy | intermittent | 150(66) |
| 5 | Ingersoll-Rand(ES-1) | 10,950 | N/A |
| 6 | Chicago Pnuematic | 14,500 | 280(138) |
| 7 | Chicago Pneumatic | 9,850 | 280(138) |
| 8 | Ingersoll-Rand(ER-1) | 5,330 | N/A |
| 9 | Ingersoll-Rand(Type 30) | 6,302 | N/A |
| 10 | Ingersoll-Rand(Type 30) | 1,144 | N/A |
| 11 | Ingersoll-Rand(Type 30) | intermittent | 155(68) |
| 12 | Ingersoll-Rand(PRE) | 11,260 | 270(132) |
| 13 | Ingersoll-Rand(PRE) | 11,210 | 270(132) |

TABLE-continued

| Example | Compressor | Hours of Operation | Valve Discharge Temperature, °F. (°C.) |
|---|---|---|---|
| 14 | Ingersoll-Rand(XLE) | intermittent | 360(182) |

N/A = not available

We claim:

1. A lubricant composition comprising, (A) about 15 to 45 weight percent of an ester of a monohydric alcohol having 4 to 18 carbon atoms with one or more aromatic [or alkane] dicarboxylic acids having 4 to 18 carbon atoms, and (B) about 85 to 55 weight percent of one or more polyether polyols which have a flash point greater than 375° F. (191° C.) and which have the formula $$Z-[(-R^1O)_n-R^2]_m$$

where

Z is the residue of a compound having 1-8 hydroxyl groups, $R^1$ is an alkylene radical having 2 to 4 carbon atoms, n is a number having an average value which will give a number average molecular weight range from about 400 to about 5000 for the final compound, m is an integer having a value of from 1 to about 8, $R^2$ is hydrogen or an alkyl group of 1 to 6 carbon atoms.

2. The lubricant composition of claim 1 wherein the weight percent of said ester ranges from 15 to 25 and the weight percent of said polyol ranges from 75 to 85.

[3. A lubricant composition comprising, (A) about 15 to 45 weight percent of an ester of a monohydric alcohol having 4 to 18 carbon atoms with one or more alkandioic acids having 4 to 18 carbon atoms, and (B) about 85 to 55 weight percent of one or more polyoxyalkylene glycols having a flash point greater than 375° F. (191° C.) and having a number average molecular weight range from about 400 to 5000.]

[4. The lubricant composition of claim 3 wherein said polyoxyalkylene glycols are homopolymers.]

[5. The lubricant composition of claim 3 wherein said polyoxyalkylene glycols are random copolymers.]

[6. The lubricant composition of claim 3 wherein said polyoxyalkylene glycols are block copolymers.]

7. A lubricant composition comprising, (A) about 15 to 45 weight percent of an ester of a monohydric alcohol with one or more aromatic dicarboxylic acids, and (B) about 85 to 55 weight percent of one or more polyoxyalkylene glycols having a flash point greater than 375° F. and having a number average molecular weight range from about 700 to 2500.

8. The lubricant composition of claim 7 wherein the weight percent of the ester ranges from 15 to 25 and the weight percent of the polyglycol ranges from 85 to 75.

9. The lubricant composition of claim 8 wherein the glycol is polypropylene glycol having a number average molecular weight of 1200.

10. The lubricant composition of claim 9 which comprises 20 weight percent of said ester and 80 weight percent of said polypropylene glycol.

11. The composition of claim 1 which contains in addition (A) an effective amount of an antioxidant, (B) an effective amount of an ashless metal corrosion inhibitor, and (C) an effective amount of a cuprous deactivator.

12. The composition of claim 1 which contains in addition (A) about 0.1 to 5.0 weight percent of an aromatic amine antioxidant, (B) about 0.1 to 2.0 weight percent of a ashless metal corrosion inhibitor, and (C) about 0.001 to 0.5 weight percent of a cuprous metal deactivator.

13. The composition of claim 12 wherein said aromatic amine antioxidant is p,p'-dioctyl diphenyl amine, said ashless corrosion inhibitor is an amine salt of phosphoric acid monoester, and said cuprous metal deactivator is tolutriazole.

14. A method of lubricating a reciprocating air compressor wherein said compressor is continuously run for long time intervals without downtime for valve maintenance which comprises using as the lubricant [the composition of claim 11] *a composition comprising*

*(A) about 15 to 45 weight percent of an ester of an monohydric alcohol having 4 to 18 carbon atoms with one or more aromatic or alkane dicarboxylic acids having 4 to 18 carbon atoms,*

*(B) about 85 to 55 weight percent of one or more polyether polyols which have a flash point greater than 375° F. (191° C.) and which have the formula*

$$Z-[(-R^1O)_n-R^2]_m$$

*where Z is the residue of a compound having 1-8 hydroxyl groups, $R^1$ is an alkylene radical having 2 to 4 carbon atoms, n is a number having an average value which will give a number average molecular weight range from about 400 to about 5000 for the final compound, m is an integer having a value of from 1 to about 8, $R^2$ is hydrogen or an alkyl group of 1 to 6 carbon atoms,*

*(C) an effective amount of an antioxidant,*

*(D) an effective amount of an ashless metal corrosion inhibitor, and*

*(E) an effective amount of a cuprous deactivator.*

15. A method of lubricating a reciprocating air compressor wherein said compressor is continuously run for long time intervals without downtime for valve maintenance which comprises using as the lubricant [the composition of claim 12] *a composition comprising*

*(A) about 15 to 45 weight percent of an ester of an monohydric alcohol having 4 to 18 carbon atoms with one or more aromatic or alkane dicarboxylic acids having 4 to 18 carbon atoms,*

*(B) about 85 to 55 weight percent of one or more polyether polyols which have a flash point greater than 375° F. (191° C.) and which have the formula*

$$Z-[(-R^1O)_n-R^2]_m$$

*where Z is the residue of a compound having 1-8 hydroxyl groups, $R^1$ is an alkylene radical having 2 to 4 carbon atoms, n is a number having an average value which will give a number average molecular weight range from about 400 to about 5000 for the final compound, m is an integer having a value of*

*from 1 to about 8, $R^2$ is hydrogen or an alkyl group of 1 to 6 carbon atoms,*

*(C) about 0.1 to 5.0 weight percent of an aromatic amine antioxidant,*

*(D) about 0.1 to 2.0 weight percent of a ashless metal corrosion inhibitor, and*

*(E) about 0.001 to 0.5 weight percent of a cuprous metal deactivator.*

16. A method of lubricating a reciprocating air compressor wherein said compressor is continuously run for long time intervals without downtime for valve maintenance which comprises using as the lubricant [the composition of claim 13] *a composition comprising*

*(A) about 15 to 45 weight percent of an ester of an monohydric alcohol having 4 to 18 carbon atoms with one or more aromatic or alkane dicarboxylic acids having 4 to 18 carbon atoms,*

*(B) about 85 to 55 weight percent of one or more polyether polyols which have a flash point greater than 375° F. (191° C.) and which have the formula*

$$Z-[(-R^1O)_n-R^2]_m$$

*where Z is the residue of a compound having 1-8 hydroxyl groups, $R^1$ is an alkylene radical having 2 to 4 carbon atoms, n is a number having an average value which will give a number average molecular weight range from about 400 to about 5000 for the final compound, m is an integer having a value of from 1 to about 8, $R^2$ is hydrogen or an alkyl group of 1 to 6 carbon atoms,*

*(C) an effective amount of p,p'-dioctyl diphenyl amine,*

*(D) an effective amount of an amine salt of phosphoric acid monoester, and*

*(E) an effective amount of tolutriazole.*

* * * * *